United States Patent
Flynn et al.

(10) Patent No.: US 7,489,938 B2
(45) Date of Patent: Feb. 10, 2009

(54) APPARATUS AND METHOD FOR PROVIDING LOCATION INFORMATION

(75) Inventors: Dan Flynn, McKinney, TX (US); Metin Barut, Irving, TX (US); Mark Cotherman, Lewisville, TX (US)

(73) Assignee: Nokia Corporation, Espoo (FI)

( * ) Notice: Subject to any disclaimer, the term of this patent is extended or adjusted under 35 U.S.C. 154(b) by 1120 days.

(21) Appl. No.: 10/607,539

(22) Filed: Jun. 27, 2003

(65) Prior Publication Data

US 2004/0229632 A1 Nov. 18, 2004

Related U.S. Application Data

(60) Provisional application No. 60/470,239, filed on May 14, 2003.

(51) Int. Cl.
*H04Q 7/20* (2006.01)
(52) U.S. Cl. ............... 455/456.3; 455/433; 455/456.2; 455/456.5; 342/357.09; 342/357.17
(58) Field of Classification Search .............. 455/432.1, 455/432.3, 433, 435.1, 456.1, 456, 456.2, 455/456.3, 456.5; 342/357.01, 357.09, 357.17
See application file for complete search history.

(56) References Cited

U.S. PATENT DOCUMENTS

| | | | |
|---|---|---|---|
| 6,360,102 B1 | 3/2002 | Havinin et al. | |
| 6,463,288 B1 | 10/2002 | Havinia et al. | |
| 7,082,311 B2 * | 7/2006 | Hefner et al. | ............ 455/456.1 |
| 7,218,940 B2 * | 5/2007 | Niemenmaa et al. | ..... 455/456.1 |
| 2003/0148774 A1 * | 8/2003 | Naghian et al. | ............. 455/456 |
| 2003/0157942 A1 * | 8/2003 | Osmo | ......................... 455/456 |
| 2004/0087315 A1 * | 5/2004 | Dufva et al. | ............. 455/456.1 |
| 2004/0224702 A1 * | 11/2004 | Chaskar | .................. 455/456.3 |
| 2004/0242238 A1 * | 12/2004 | Wang et al. | .............. 455/456.1 |

OTHER PUBLICATIONS

3GPP TS 23.271, Technical Specification, vol. 6.2.0 (Dec. 2002) 3rd Generation Partnership Project; Technical Specification Group Services and System Aspects; Functional Stage 2 Description of LCS (Release 6).

* cited by examiner

*Primary Examiner*—Binh K Tieu
(74) *Attorney, Agent, or Firm*—Squire, Sanders & Dempsey L.L.P.

(57) ABSTRACT

An apparatus and method provides information associated with a location of a target user in a location service arrangement including a plurality of location service entities. The method includes the steps of sending a request for information associated with a location of a target user from a first location service entity to a second location service entity. The method includes the step of informing the second location service entity of a role performed by the second location service entity when processing the request. The method also includes the step of processing the request at the second location service entity.

29 Claims, 3 Drawing Sheets

APPARATUS AND METHOD FOR PROVIDING LOCATION INFORMATION

CROSS-REFERENCE TO RELATED APPLICATIONS

This application claims priority of U.S. Provisional Application Ser. No. 60/470,239 entitled, "Location Information," filed May 14, 2003, the entire contents of which are incorporated herein by reference.

BACKGROUND OF THE INVENTION

1. Field of the Invention

The invention relates to location services, and in particular, but not exclusively, to processing of location information in a plurality of location information entities associated with a communication system.

2. Description of the Related Art

Communication systems providing mobility for the users thereof are known. A well-known example of such mobile communication systems is the public land line mobile network (PLMN), of which cellular communications networks are an example. Another example is a mobile communication system that is based, at least partially, on the use of communication satellites.

In such systems, the mobile network apparatus and/or user equipment such as a mobile station can be employed for provision of information regarding the geographical location of the user equipment and thus the user thereof. An arrangement configured to provide location information is often called by the name location service (LCS) or location information service.

The position of mobile user equipment, and the equipment's user, can be positioned by various techniques. For example, fairly accurate geographical location information can be obtained based on the known satellite based GPS (Global Positioning System). More accurate location information can be obtained through differential GPS techniques. Another proposed satellite based location system is known by the name Galileo.

Another possibility is to use a location service based on a cellular telecommunications system. In this approach, the cells or similar geographically limited radio access entities and associated controllers of the communication system are utilized in the production of at least a rough estimate of the current location of the mobile user equipment. To improve the accuracy of the location information the communication system may be provided with specific location measurement units that provide more accurate information concerning the location of the user equipment within the service area of the cellular system. It is also possible to ascertain a geographical location when the mobile user equipment is located within the coverage area of a visited or "foreign" network. The visited network may be configured to transmit the location of the mobile user equipment back to the home network, e.g. to support services that are based on location information or for the purposes of routing and charging. The particular way in which location information is produced does not form an essential element of the present invention, and is thus not described in any greater detail herein. Location information may also be produced based on information from both the satellite based and the communication system based location systems.

The location service entities provided by the communication system may serve different location service (LCS) clients via appropriate interfaces. The location information may be used for various purposes, such as for location of a mobile telephone that has made an emergency call, for locating vehicles or mobile subscribers and so on. In general, a client such as a user equipment (UE), a service application provided e.g. by means of the Internet or another information communication facility or any other entity wishing to receive location information regarding a user equipment may send a request for such information to the location service provision entity. The location service provisioning entity will then process the request, obtain the required information and generate an appropriate response.

The location information may be processed in one or more specific location service entities implemented either within the cellular system or connected thereto. In a typical operation the location information is provided for the client entity as a result of co-operation of a plurality of location information entities such as servers associated with the location services. The current location specifications allow roaming between location information entities, such as location servers. In practice this means that location information of a target user can be processed in different servers depending on the location of the mobile target user. Therefore the location servers may have different roles depending on the location of the target user and also the origin of the request. The conventional location servers may act in three different roles, namely as a receiving location server, a home location server and a visited location server.

The receiving location server (RLS) is the location server that originally receives a location request from a LCS Client. This request may be communicated over any appropriate interface, for example over a conventional Mobile Location Protocol (MLP) 3.0 interface. At some point the receiving location information service entity may realize that it cannot fulfill the client's request. Therefore the receiving location server may need to initiate "roaming" to other location service entities.

A home location server is the server responsible for enforcing the privacy options setup by the user. A home location server can thus be understood as being a location server that possesses or at least has access to subscriber related information such as the subscriber privacy profile. The home location server may also be capable of performing the actual positioning if the target user (the subscriber) is actually located in the home area. Otherwise, the home location server is responsible for forwarding the request to a visited location server where the positioning will then take place.

The visited location server is the location server responsible for positioning in the area where the target user is currently located. In this role the only responsibility of the location server is to perform the actual positioning of the subscriber.

A given location server may serve in any of the above roles for any given request. Also, a given location server may be responsible for all possible roles for certain requests or it may be responsible for a combination of at least two roles.

Conventionally a location server receiving a location request from another location service entity is expected to interpret its role from the parameters of the request from the requesting location service entity. This means that the decision regarding the role that the location server shall play during the roaming scenarios is left in its entirety to the location server that received the request. However, the parameters received by the location server may not clearly dictate what role the receiving location server is expected to play from the point of view of the requesting location server. Thus it may occur in certain scenarios that the location server concludes that it shall play a role which was not expected by the requesting location server. The confusion is due to the extrapolation of the role of the location server from the parameters received from the requesting location server.

In the event that a location server receiving a request assumes a role not expected by the requesting location server, security holes are possible in the roaming scenarios in accordance with the roaming specifications. A lowered security may be caused, for example, by bypassing of mobile subscriber privacy settings when performing location roaming on the interface between location servers. The problem may result from a combination of various seemingly unrelated factors. For example, the used interface protocol may force the home location server (HLS) and visited location server (VLS) to "assume" their role based on data they receive and the absence or presence of profile data. At the same time the subscriber databases and/or routing tables may not be 100% accurate at all times.

If a location server determines it is not the home location server (HLS) because it cannot find the subscriber profile, it will route the request to another location server. A problem here may be that the home location server may not have the subscriber profile and therefore it may think that it should act as a visited location server (VLS). That is, a server incorrectly acting as a visited location server may i.e. position the subscriber without ever performing any privacy checks and return this data to the requesting entity. It is thus possible that a home location server returns the location result as it would be a visited location server without doing privacy checks. The requesting server may then believe the home location server did perform the privacy checks and therefore would return the result to a possibly unauthorized LCS Client.

Another problematic situation may occur where the location service node initially receiving the location request from a client believes it shall act as a visited location server when it is expected to play the role of a home location server. If the location server acts as a visited location server, it will go straight to positioning the target user without the privacy or any other checks. It is possible, that the target user may not be in this area, and so an error message may be returned. Although the client does not get the location information, the error message is sent for incorrect reasons. Authorized clients may not receive the information they should have received. This is an unnecessary error situation since the target user could be located by the visited location server. However, since the home location server is incorrectly trying to accomplish the positioning, an error occurs.

SUMMARY OF THE INVENTION

Embodiments of the present invention aim to address one or several of the above problems.

According to an embodiment of the invention, there is provided a method for providing information associated with the location of a target user in a location service arrangement including a plurality of location service entities. The method includes the steps of:

sending a request for information associated with the location of the target user from a first location service entity to a second location service entity;

informing the second location service entity of the role the second location service entity shall take when processing the request; and, processing the request accordingly at the second location service entity.

According to another embodiment of the invention there is provided a location service entity for a location information service arrangement including a plurality of location service entities configured to process requests for location information. The location information entity is configured to request for information associated with the location of a target user from a further location service entity and to inform the further location service entity of the role the further location service entity performs when processing the request.

According to yet another embodiment of the invention there is provided a location service for providing information associated with the users of a communication system, including a plurality of location service entities configured to process requests for location information, wherein a first location information entity is configured to request for information associated with the location of a target user from a second location service entity and to inform the second location service entity of the role in which the first location service expects the second location service to process the request, and the second location information entity is configured to proceed with the processing of the request only if it can provide the expected role.

The embodiments of the invention may provide a solution wherein the role selection no longer depends on assumptions of the role. The embodiments may also provide an arrangement wherein, if no privacy or similar check can be performed by an appropriate location service entity, the request for location information is not processed further in order to avoid lapses in security. Since a location service entity receiving request from another location service entity can be told unambiguously the role in which it is expected to act, the risk for incorrect assumptions is removed as no assumptions need to be made in this regard. A location service entity server may be made aware of the expectations by the requesting location service entity and should thus be able to send an error if it could not meet those expectations. The embodiments may also prevent location errors due to attempting positioning at a home location server instead of routing the requests to a proper visited location server.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Figure 1:
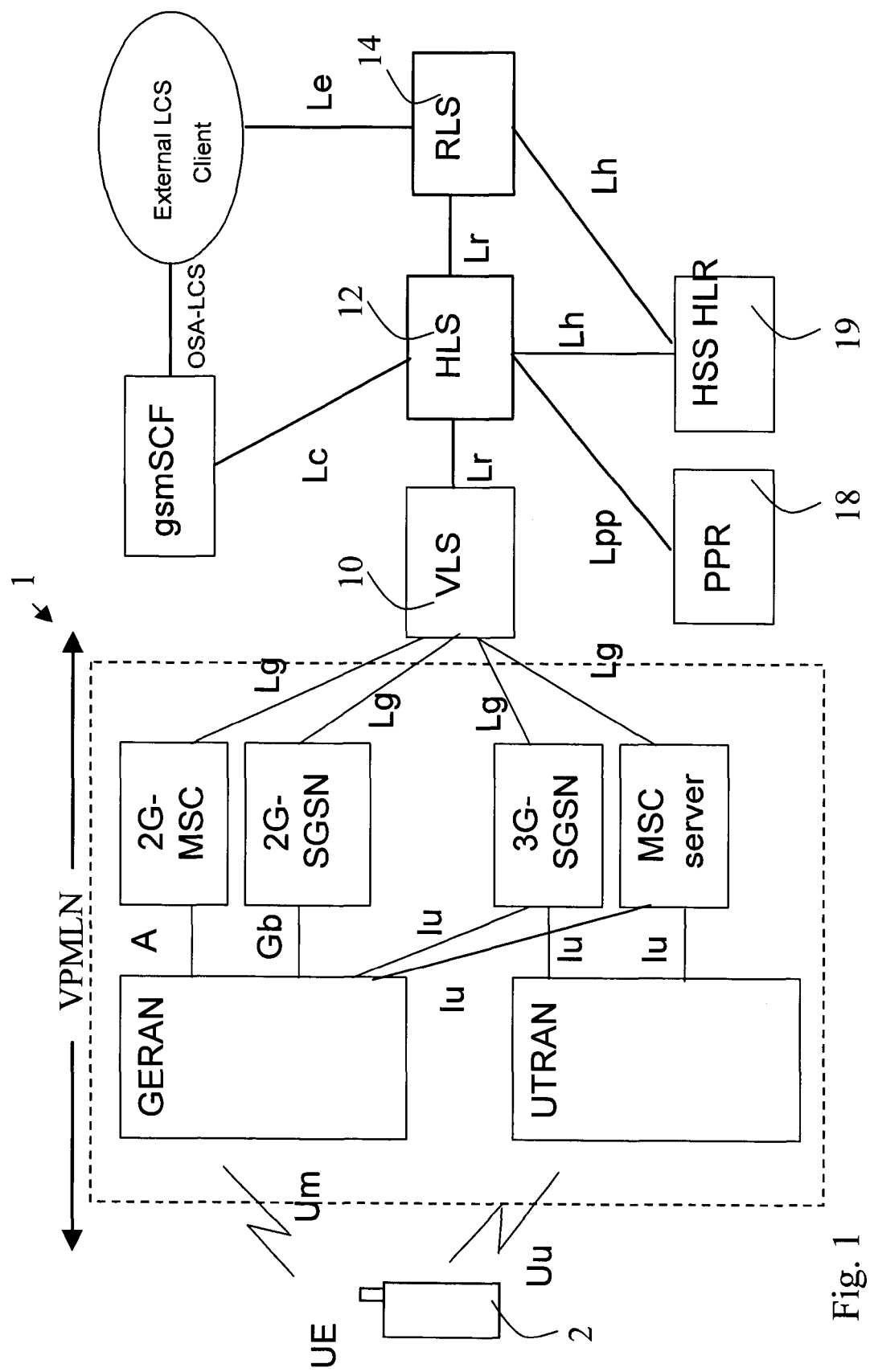
FIG. 1 shows a location service architecture wherein the invention can be embodied.

Reference is made to FIG. 1 which shows an architecture wherein the invention may be embodied. More particularly, FIG. 1 shows a visited public land mobile network (PLMN) 1 serving a mobile user equipment 2 over a wireless interface. The mobile communication network 1 may be based on any appropriate standard. The user equipment 2 is used by a user who is the target of a request for location information. Hence the user equipment 2 is referred to as the target user or the target user equipment.

A communication system, such as the mobile communication network 1, typically includes a plurality of various networks elements such as gateways, switches or switching centres, servers, databases, access network elements and so on. Although some of the network elements are shown in FIG. 1, it shall be understood that these are not essential for the operation of the invention. Therefore they are not explained in detail. It is sufficient to note that a mobile communication system is typically provided with a database for storing subscriber related information. In FIG. 1 the target user 2 is registered at a home subscriber server (HSS) and/or home location register 19.

FIG. 1 shows also various entities associated with the location information service. Three location information processing entities 10, 12 and 14 are configured to process location information request from a location information service client 20. The client 20 may be any entity that is capable of and allowed to request for location information from the location information service.

The location service (LCS) client 20 may make use of location information from the location service for various services/applications. A possible application may include a LCS client arranged to provide location information in response to a request from a requestor for non-call related location information regarding a target user. The requestor may be another user or any other entity, for example, an application service provider (ASP), that may make use of the information about the location of the target user 2.

In a typical implementation the location service entities are provided by appropriate servers. Thus this description will refer to servers where appropriate. However, it shall be appreciated that any entity capable of processing information for the purpose of providing location information in response to requests from clients or other location service entities may be used for the implementation of the embodiments.

In FIG. 1 the location server 14 is shown to be the location server that receives a request regarding the location of the target user 2 from the client 20. Hence this server can be referenced as the receiving location server.

The first location server 14 recognizes that it cannot fulfill the request. Therefore it needs to initiate a roaming location service procedure. In the roaming procedure the initial location server 14 passes the request to a home location server of the target user. Since the receiving server may request location information from other location servers in the roaming scenarios, it may also be referred to as the requesting server.

In FIG. 1 the home location server (HLS) of the target user 2 is provided by the location server 12. The home location server 12 provides a location information service entity that has been assigned for the target user. Each user typically has only one assigned home location information service entity. Information regarding the assigned home location server may be stored in the subscriber information database 19. The initial location server 14 may then obtain the home location server of the target user 2 by enquiring the subscriber information database 19.

The home location server 13 may store the privacy policy setting for the target user or at least it may have access to such privacy policy or other security setting of the target user. In FIG. 1 the privacy policy information for the target user 2 is shown to be stored in a privacy policy entity 18.

The visited location server (VLS) 10 is for collecting the location information from the network 1. The visited location server may be configured for gathering and storing various information from various sources that may be used in provision of location information for location service clients (LCS clients).

The visited location server may be any location server. Which one of the location servers provides the visited location server depends on the location of the target user, and the elements of the communication network the target user associates with. Some possibilities for the selection of the visited location server are described later with reference to FIG. 3.

The location servers 10, 12 and 14 may communicate with each other over any appropriate interface configured for communication between the location server entities. In the example shown in FIG. 1 the communication occurs on a inter location server interface called as Lr interface. The location servers may also, depending upon their role, access the subscriber information database 19 over an appropriate interface.

Figure 2:
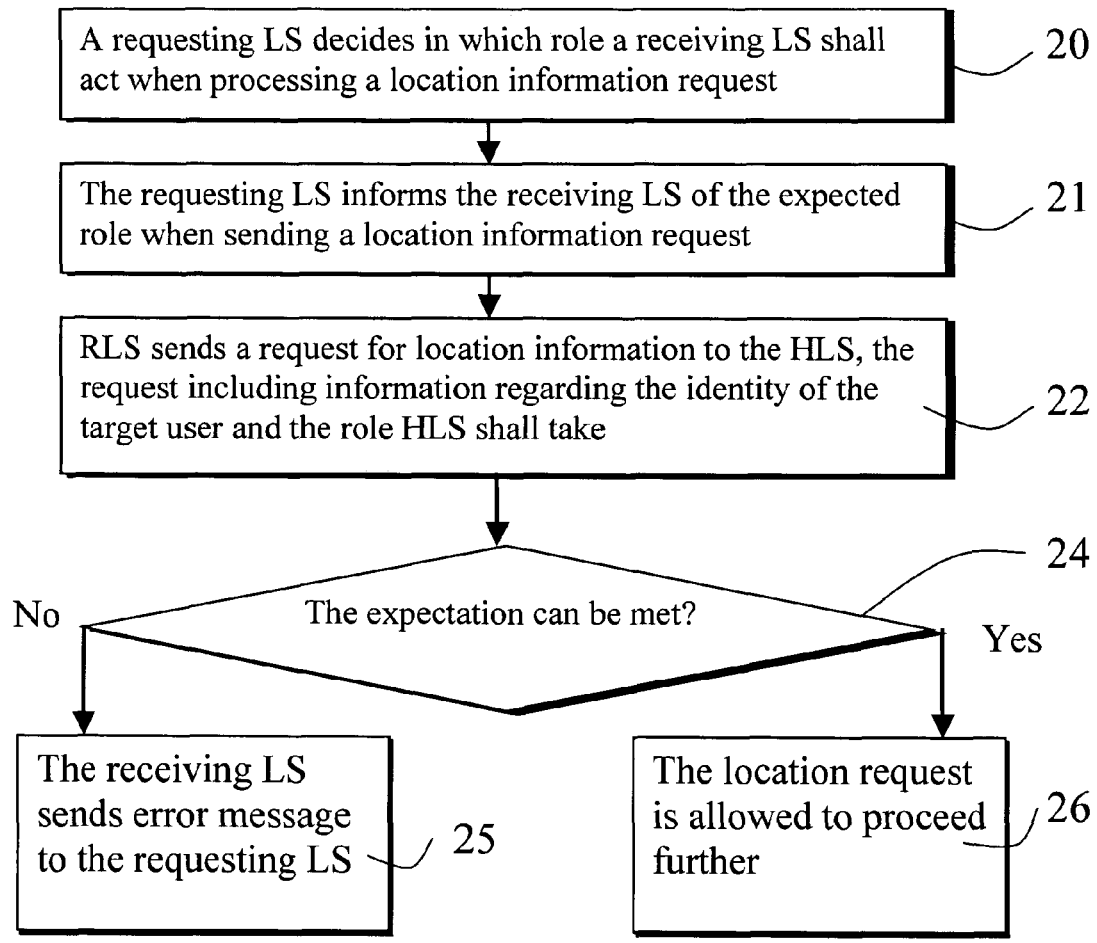
FIG. 2 is a flowchart illustrating the operation of one embodiment of the invention.

The roles of the location information service entities or servers perform in the processing of a location information request may vary depending on the client, the target user and the location of the target user. In an embodiment shown in FIG. 2, in order to prevent the location servers from acting in roles in which they should not, the requesting location server 14 makes at step 20 the decision regarding the role in which the location server 12 receiving the request shall perform. At step 21 the requesting location server 14 informs the location server 14 of the selection by adding an appropriate attribute to messages requesting for location information. The request is then sent to the next location server 12 at step 22. The request may be referred to as a 'roaming message'.

The attribute may be, for example, a receiving role attribute defining that the server receiving the request shall play the role as defined by the attribute. The receiving role attribute may have values such as 'HLS' (home location server), 'VLS' (visited location server) or 'BOTH'.

When the attribute is set to be 'HLS', the requesting location server 14 expects the location server 12 receiving the request to behave as a home location server in the manner as described in the location service specifications. The requesting location server 14 may receive information regarding the proper location server from the subscriber information database 19.

By means of the attribute the requesting location server 14 may clearly state its expectations regarding the role of the other location server 12. This is advantageous since the requesting location server 14 can now assume with greater certainty than in the conventional arrangements that the location server receiving the request will act in the expected role.

If the expectation by the requesting location server 14 can not be met, the roaming request is rejected by the second location server 12 at step 24. An error message may be returned to the first, i.e. the requesting location server 14, see step 25. If the expectation is met at step 24, i.e. the server 14 can act as home location server for the target user 2, the location request is allowed to proceed in accordance with the normal procedures of the location services, step 26.

It should be appreciated that the home location server 12 may correspondingly inform the next location server in the chain, that is the visited location server 10, of the role it expects from the location server receiving the request. Therefore the above described method is not limited to the interoperation between servers 14 and 12. Instead, any requesting location server that expects certain services from the next node in the information provision chain may send that information along to the next location server to ensure that the next node understands the services required from it.

Thus, the attribute can be set to 'VLS', and thus the requesting location server expects the next location server to behave as a visited location server in the manner as described in the roaming specifications. If the attribute is set to 'BOTH', the requesting location server expects the location server to behave as both a home location server and a visited location server in a manner as described in the roaming specifications.

The above described embodiment may remove the uncertainty caused by the guess work out of what services the location server receiving the request should attempt to perform. This may prevent bypassing mobile subscriber privacy settings, thus improving the security. Undefined error situations may also be avoided since the location server is forced to play the correct role. Therefore any server assumed to play a home location server role may perform a privacy check and then "route" the request to the proper visited location server instead of attempting to perform the positioning itself.

Figure 3:
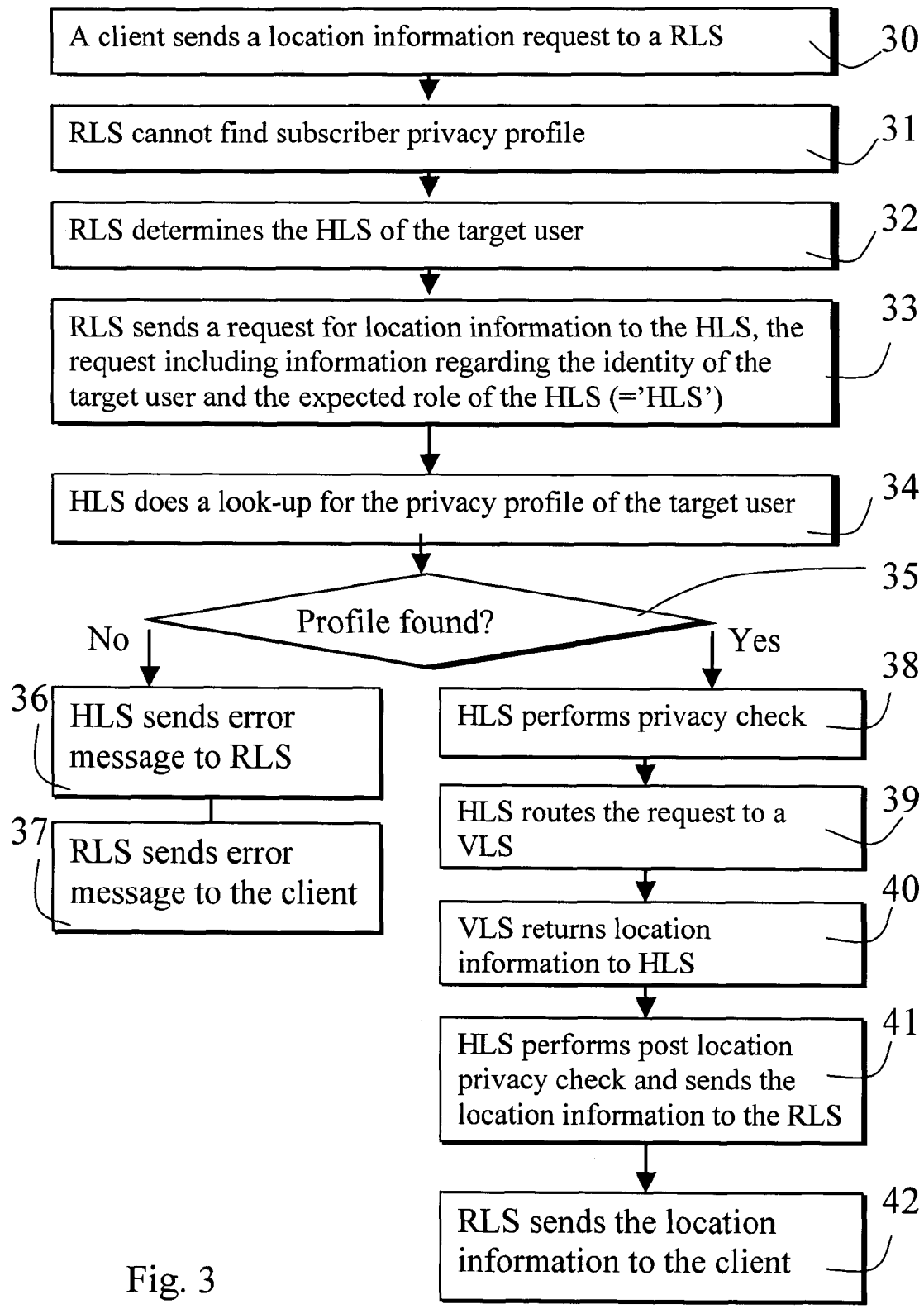
FIG. 3 is a flowchart illustrating another embodiment of the invention.

The following describes another exemplifying embodiment with reference to the flowchart of FIG. 3.

In step 30 a client sends a request for location information to a requesting location server (RLS). The request may be of any appropriate format, for example a Standard Location Immediate Request (SLIR).

In step 31 the RLS does a lookup for subscriber privacy profile. The lookup may be based on MSISDN/IMSI Mobile (Subscriber International ISDN Number International Mobile Subscriber Identity). Since the profile is not found, the RLS may use the identity information from the request to determine the home location server (HLS) of the target user, step 32. For example, if the IMSI is used as the identity, IMSI routing lookup table may be used for this purpose. A possibility is to send a MAP Layer SRI/sendIMSI message (MAP=Mobile Application Part; SRI=Send Routing Information).

The RLS may then send at step 33 a location information request to the HLS on the Lr interface between the servers. The request may be a SRLIR (Standard Roaming Location Immediate Request) with IMSI. The request may, if required, include also other information such as Visiting Mobile Services Switching Center (VMSC) of the target user and so on.

In the preferred embodiment the request also informs the HLS of it's role. In FIG. 3 role attribute 'HLS' is added in the message, thus indicating to the receiving location server that it shall act as a home location server.

The home location server (HLS) then gets the identity information for the target user and other possible information. The home location server also gets its role from the data received. The HLS may then do a lookup for subscriber privacy profile at step 34.

If the profile is not found, the HLS sends at step 36 an error message back to the RLS. The HLS can do this since it knows that it is supposed to have subscriber privacy profile before allowing the request to proceed. Since the HLS is not able to find the profile, further processing of the request is prevented and an error message is returned.

The RLS gets the error message from HLS and may pass that back to the LCS Client, for example over a MLP interface, step 37. The LCS Client then gets an error message as a response to its request for location information.

If the profile is located at step 34, the HLS performs a privacy check, step 38. If the HLS is aware of the VMSC of the target user, the HLS routes at step 39 the SRLIR request to the VLS based on the VMSC address and passes the required data to the VLS. If the VSMC is not known, the HLS may perform an appropriate procedure for obtaining the required routing information, such as a 'send routing information' (SRI).

In accordance with this embodiment, the HLS informs the VLS of the expected role thereof. Thus, when the VLS receives the IMSI, VMSC and other possible data included in the SRLIR, it may also receive an indication of the role thereof. A similar attribute to that used in communication between the RLS and the HLS may be used here. The VLS may then perform appropriate location information obtaining procedure, such as the 'Provide Subscriber Location' (PSL). The VLS may be told the role it is expected and thus it can assume that the privacy check has been done by the HLS. The VLS gets location information from the network and passes the information back to the HLS over Lr interface at step 40. The HLS may perform a post location privacy check, if so required. The HLS passes the location information back at step 41 to the RLS over Lr interface. The RLS may then pass the location information to the LCS Client at step 42.

The above mentions 'Standard Roaming Location Immediate Request' serve as an example of the roaming message. Another example of the roaming messages is the 'Triggered Roaming Location Immediate Request'.

In this embodiment the attribute is attached to the top level element in the Standard Roaming Location Immediate Request DTD and/or the and Triggered Roaming Location Immediate Request DTD. These elements are srlir and trlrr respectively. A detailed example of this is given below:

| | | |
|---|---|---|
| <!ELEMENT | Srlir | (msid, gsm_net_param?, codeword?, session?, eqop?, geo_info?, loc_type?, prio?, pushaddr? %extension.param;)> |
| <!ATTLIST | srlir | |
| | ver CDATA | #FIXED "1.0.0" |
| | res_type (SYNC \| ASYNC) | "SYNC" |
| | recv_role (HLS \| VLS \| BOTH) | #REQUIRED> |
| <!ELEMENT | Trlrr | (msid, interval, start_time?, stop_time?, qop?, geo_info?, pushaddr?, loc_type?, prio? %extension.param;)> |
| <!ATTLIST | trlrr | |
| | ver CDATA | #FIXED "1.0.0" |
| | recv_role (HLS \| VLS \| BOTH) | #REQUIRED> |

The 'recv_role' attribute may be made mandatory. In such case the attribute must be set by the requesting location server. In such scenario, if the receiving location server can not meet the expectations of the requesting location server, the request must be rejected by the receiving location server.

In the preferred embodiment the role information is transferred between the initiating i.e. first location server and the receiving i.e. the second location server in the request message for location information. It is, however, possible for the requesting location server to send a separate message for informing the next location server of the role it shall play. Thus two messages may be communicated such that one message is the request and another message is for informing the second location server of its expected role. These messages may then be combined at the receiving end based on, for example, message identifiers or any other appropriate matching technique.

The inclusion of the role into the request may be required in certain protocols. For example, it may not be possible to separately send the role because the used location protocols used may be stateless. With a stateless protocol the recipient cannot match the role sent over with the request it is intended for. The Lr and Le interfaces shown in FIG. 1 are examples of interfaces that are based on stateless protocols.

It is noted that the above discussed examples the location servers may include Gateway Mobile Location Centers (GMLCs). A location service employing Gateway Mobile Location Centers is described in more detail in a third generation partnership project (3GPP) specification 3GPP TS 23.271 V6 2.0 (December 2002) '3$^{rd}$ Generation Partnership Project; Technical Specification Group Services and System Aspects;

Functional Stage 2 Description of LCS (Version 6)'. This document is incorporated herein by reference.

It should be appreciated that whilst embodiments of the present invention have been described in relation to user equipment such as mobile stations, embodiments of the present invention are applicable to any other suitable type of user equipment.

The embodiment of the invention has discussed the interface between two location servers. Embodiments of the present invention can be applicable to other network elements where applicable.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
sending a request for information associated with a location of a target user at a first location service entity to a second location service entity;
selecting a role of the second location service entity from at least one of a home location service entity, a visited location service entity and a combination of a home and visited location service entities; and
informing the second location service entity of the role performed by the second location service entity when processing the request.

2. A method as claimed in claim 1, further comprising:
including information regarding the role of the second location service entity in the request.

3. A method as claimed in claim 1, further comprising processing the request at the second location service entity.

4. A method as claimed in claim 1, further comprising:
receiving at the first location service entity a request for location information and
subsequently sending the request from the first service entity to the second location service entity.

5. A method as claimed in claim 4, wherein the sending comprises sending the request from the first location service entity which initiates roaming location services.

6. A method as claimed in claim 1, further comprising:
sending information from the second location service entity to a third location service entity regarding the role performed by the third location service entity when processing a request from the second location service entity.

7. A method as claimed in claim 6, wherein the sending information comprises sending information to the third location service entity comprising a visited location server.

8. A method as claimed in claim 1, wherein the sending comprises sending the request from the first location service entity comprising a receiving location server to the second location service entity comprising the home location server of the target user.

9. A method, comprising:
receiving a request for information associated with a location of a target user from a first location service entity at a second location service entity;
receiving information that the second location service entity is to perform a role of a home location server when processing the request from the first location service entity;
performing a privacy policy check at the second location service entity; and
preventing at the second location service entity processing of the request for location information in response to a failed privacy policy check.

10. An apparatus, comprising:
a processor configured to request for information associated with a location of a target user from a further location service entity, to select the role of the further location service entity from at least one of a home location service entity, a visited location service entity and a combination of a home and visited location service entities, and to inform the further location service entity of a role the further location service entity performs when processing the request.

11. The apparatus as claimed in claim 10, wherein a location service entity is configured to add information into the request regarding the role the further location service entity performs.

12. The apparatus as claimed in claim 10, wherein a location service entity is configured to initiate roaming location services.

13. The apparatus as claimed in claim 12, further comprising:
a receiving location server.

14. The apparatus as claimed in claim 10, further comprising:
a home location server.

15. A system, comprising:
a location service arrangement configured to provide information associated with the users of a communication system, comprising a plurality of location service entities configured to process requests for location information, wherein a first location information entity is configured to request for information associated with a location of a target user from a second location service entity, to select the role of the second location service entity from at least one of a home location service entity, a visited location service entity and a combination of a home and visited location service entities, and to inform the second location service entity of a role in which the first location service expects a second location service to process a request, and the second location information entity is configured to proceed with the processing of the request if the second location information entity can provide an expected role.

16. The system as claimed in claim 15, wherein the first location service entity is configured to initiate roaming location services.

17. The system as claimed in claim 16, wherein the first location service entity comprises a receiving location server.

18. The system as claimed in claim 17, wherein the second location service entity comprises a home location server of the target user, the home location server being configured to inform a third location service entity regarding the role the third location service entity performs when processing a request for location information from the home location server.

19. The system as claimed in claim 15, wherein the first location service entity comprises a home location server.

20. An apparatus, comprising:
receiving means for receiving a request for information associated with a location of a target user from a first location service entity at a second location service entity;
receiving information means for receiving information of a role performed by the second location service entity when processing the request at the second location service entity; and
processing means for processing the request at the second location entity, wherein the role of the second location service entity is selected from at least one of a home location service entity, a visited location service entity and a combination of a home and visited location service entities.

21. The apparatus as claimed in claim 20, further comprising:
including means for including information regarding the role of the second location service entity in the request.

22. A computer program embodied on a computer readable medium, the computer program being configured to control a processor to perform:
receiving a request for information associated with a location of a target user from a first location service entity at a second location service entity;
receiving information of a role performed by the second location service entity when processing the request, the role of the second location service entity being selected from at least one of a home location service entity, a visited location service entity and a combination of a home and visited location service entities; and
processing the request at the second location service entity.

23. A computer program embodied on a computer readable medium, the computer program being configured to control a processor to perform:
sending a request for information associated with a location of a target user at a first location service entity to a second location service entity;
selecting a role of the second location service entity from at least one of a home location service entity, a visited location service entity and a combination of a home and visited location service entities; and
informing the second location service entity of the role performed by the second location service entity when processing the request.

24. A method, comprising:
receiving a request for information associated with a location of a target user from a first location service entity at a second location service entity;
receiving information of a role performed by the second location service entity when processing the request, the role of the second location service entity being selected from at least one of a home location service entity, a visited location service entity and a combination of a home and visited location service entities; and
processing the request at the second location service entity.

25. An apparatus, comprising:
at least one receiver configured to receive a request for information associated with a location of a target user from a first location service entity at a second location service entity, and to receive information that the second location service entity is to perform a role of a home location server when processing the request from the first location service entity; and
a processor configured to perform a privacy policy check at the second location service entity and a preventing unit configured to prevent the processing from processing the request for location information in response to a failed privacy policy check.

26. A computer program embodied on a computer readable medium, the computer program being configured to control a processor to perform:
receiving a request for information associated with a location of a target user from a first location service entity at a second location service entity;
receiving information that the second location service entity is to perform a role of a home location server when processing the request from the first location service entity;
performing a privacy policy check at the second location service entity; and
preventing at the second location service entity processing of the request for location information in response to a failed privacy policy check.

27. An apparatus, comprising:
at least one receiver configured to receive a request for information associated with a location of a target user from a first location service entity at a second location service entity, and to receive information of a role performed by the second location service entity when processing the request at the second location service entity, the role of the second location service entity being selected from at least one of a home location service entity, a visited location service entity and a combination of a home and visited location service entities; and
a processor configured to process the request at the second location entity.

28. An apparatus, comprising:
requesting means for requesting information associated with a location of a target user from a further location service entity;
informing means for informing the further location service entity of a role the further location service entity performs when processing the request; and
selecting means for selecting the role of the further location service entity from at least one of a home location service entity, a visited location service entity and a combination of a home and visited location service entities.

29. An apparatus, comprising:
receiving means for receiving a request for information associated with a location of a target user from a first location service entity in a second location service entity;
information receiving means for receiving information that the second location service entity is to perform a role of a home location server when processing the request from the first location service entity;
performing means for performing a privacy policy check at the second location service entity; and
preventing means for preventing processing in the second location service entity of the request for location information in response to a failed privacy policy check.

* * * * *